(12) United States Patent
Cagno et al.

(10) Patent No.: US 7,995,675 B2
(45) Date of Patent: Aug. 9, 2011

(54) APPARATUS AND METHOD TO COMMUNICATE INFORMATION WITHIN A DATA STORAGE LIBRARY

(75) Inventors: Brian James Cagno, Tucson, AZ (US);
John Charles Elliott, Tucson, AZ (US);
D. Scott Smith, Tucson, AZ (US);
Kenny Nian Gan Qiu, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 756 days.

(21) Appl. No.: 12/031,546

(22) Filed: Feb. 14, 2008

(65) Prior Publication Data
US 2009/0207921 A1 Aug. 20, 2009

(51) Int. Cl.
*H03K 7/06* (2006.01)
(52) U.S. Cl. ...................................................... 375/303
(58) Field of Classification Search .................. 375/269, 375/272, 303, 334, 335, 336, 337; 329/300; 332/100; 398/135, 138, 140, 199, 200, 201
See application file for complete search history.

(56) References Cited

U.S. PATENT DOCUMENTS

| 5,379,037 A * | 1/1995 | Harrison et al. ................. 341/71 |
| 5,541,406 A | 7/1996 | Waynik et al. |
| 5,808,770 A | 9/1998 | Chen et al. |
| 6,279,829 B1 | 8/2001 | Hems et al. |
| 6,415,005 B2 * | 7/2002 | Koga et al. ..................... 375/347 |
| 6,609,841 B1 | 8/2003 | Wilde et al. |
| 6,757,342 B1 * | 6/2004 | Nakamura et al. ............ 375/334 |
| 6,804,466 B1 | 10/2004 | Gazzetta et al. |
| 7,016,115 B1 * | 3/2006 | Leeb et al. ..................... 359/589 |
| 7,072,536 B2 | 7/2006 | Poovey |

* cited by examiner

*Primary Examiner* — Sam K Ahn
(74) *Attorney, Agent, or Firm* — Dale F. Regelman; Quarles & Brady LLP

(57) ABSTRACT

A method to communicate information within a data storage system comprising a plurality of enclosures, wherein the method defines and stores a first waveform comprising a frequency $F_B$, a second waveform comprising a frequency $F_0$ wherein that second waveform is decoded to mean a bit comprising a first value, and a third waveform comprising a frequency $F_1$, wherein that third waveform is decoded to mean a bit comprising a second value. The method transmits by an initiating enclosure a byte of data encoded as eight data waveforms, wherein each of those data waveforms comprises the frequency $F_B$ in combination with either the frequency $F_1$ or the frequency $F_0$.

20 Claims, 14 Drawing Sheets

US 7,995,675 B2

APPARATUS AND METHOD TO COMMUNICATE INFORMATION WITHIN A DATA STORAGE LIBRARY

FIELD OF THE INVENTION

This invention relates to an apparatus and method to communicate information within a data storage library.

BACKGROUND OF THE INVENTION

Data storage systems are used to store information provided by one or more host computer systems. Such data storage systems receive requests to write information to one or more data storage devices, and requests to retrieve information from those one or more data storage devices. Upon receipt of a write request, the system stores information received from a host computer in a data cache. In some storage systems, a copy of that information is also stored in a nonvolatile storage device. Upon receipt of a read request, the system recalls information from the one or more data storage devices and moves that information to the data cache. Thus, the system is continuously moving information to and from a plurality of data storage devices, and to and from the data cache.

Data storage systems can comprise a plurality of enclosures, wherein certain of those enclosure comprise data storage device enclosures comprising a plurality of data storage devices. A system controller communicates with the plurality of enclosures using a communication protocol, such as for example a Fibre Channel protocol. In addition, each enclosure is in communication with one or two adjacent enclosures.

SUMMARY OF THE INVENTION

The invention comprises a method to communicate information within a data storage system comprising a plurality of enclosures. The method defines and stores a first waveform comprising a frequency $F_B$, a second waveform comprising a frequency $F_0$ wherein that second waveform is decoded to mean a bit comprising a first value, and a third waveform comprising a frequency $F_1$, wherein that third waveform is decoded to mean a bit comprising a second value. The method transmits by an initiating enclosure a byte of data encoded as eight data waveforms, wherein each of those data waveforms comprises the frequency $F_B$ in combination with either the frequency $F_1$ or the frequency $F_0$.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
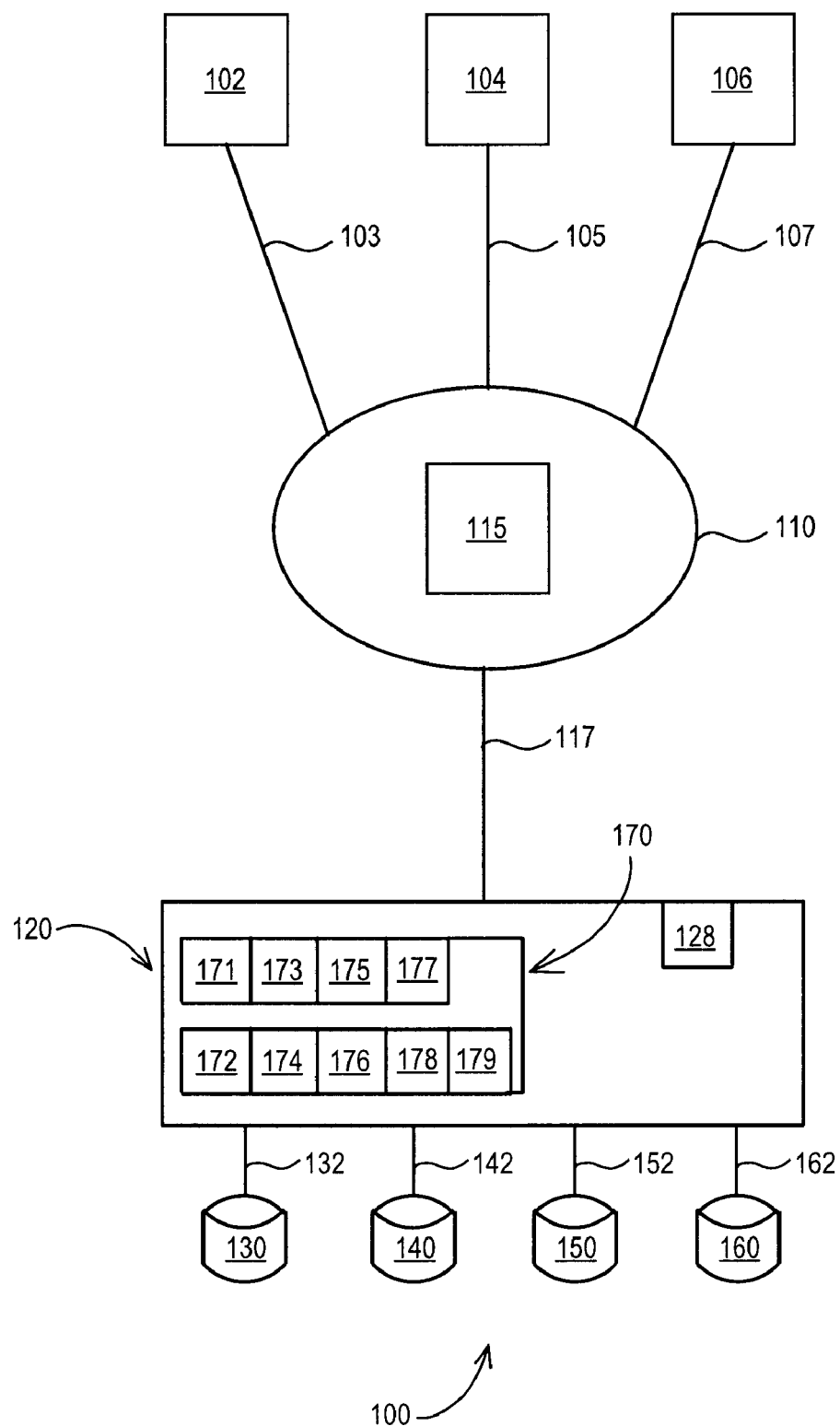
FIG. 1 is a block diagram showing one embodiment of Applicants' data storage system.

In the illustrated embodiment of FIG. 1, computing system 100 comprises system controller 120 and data storage media 130, 140, 150, and 160. In the illustrated embodiment of FIG. 1, system controller 120 communicates with data storage media 130, 140, 150, and 160, via I/O protocols 132, 142, 152, and 162, respectively. I/O protocols 132, 142, 152, and 162, may comprise any sort of I/O protocol, including without limitation a fibre channel loop, SCSI (Small Computer System Interface), iSCSI (Internet SCSI), SAS (Serial Attach SCSI), Fibre Channel, SCSI over Fibre Channel, Ethernet, Fibre Channel over Ethernet, Infiniband, and SATA (Serial ATA).

By "data storage media," Applicants mean an information storage medium in combination with the hardware, firmware, and/or software, needed to write information to, and read information from, that information storage medium. In certain embodiments, the information storage medium comprises a magnetic information storage medium, such as and without limitation a magnetic disk, magnetic tape, and the like. In certain embodiments, the information storage medium comprises an optical information storage medium, such as and without limitation a CD, DVD (Digital Versatile Disk), HD-DVD (High Definition DVD), BD (Blue-Ray Disk) and the like. In certain embodiments, the information storage medium comprises an electronic information storage medium, such as and without limitation a PROM, EPROM, EEPROM, Flash PROM, compactflash, smartmedia, and the like. In certain embodiments, the information storage medium comprises a holographic information storage medium.

Further in the illustrated embodiment of FIG. 1, Applicants' system controller 120 is in communication with host computers 102, 104, and 106. As a general matter, hosts computers 102, 104, and 106, each comprises a computer system, such as a mainframe, personal computer, workstation, and combinations thereof, including an operating system such as Windows, AIX, Unix, MVS, LINUX, etc. (Windows is a registered trademark of Microsoft Corporation; AIX is a registered trademark and MVS is a trademark of IBM Corporation; UNIX is a registered trademark in the United States and other countries licensed exclusively through The Open Group; and LINUX is a registered trademark of Linus Torvald). In certain embodiments, one or more of host computers 102, 104, and/or 106, further includes a storage management program. In certain embodiments, that storage management program may include the functionality of storage management type programs known in the art that manage the transfer of data to and from a data storage and retrieval system, such as for example and without limitation the IBM DFSMS implemented in the IBM MVS operating system.

In the illustrated embodiment of FIG. 1, Applicants' system controller 120 comprises processor 128 and memory 170. Instructions 178 and microcode 179 are written to memory 170. Processor 128 utilizes microcode 122 to operate system controller 120.

Waveform 400 (FIG. 4) is encoded in memory 170 as stored waveform 171. Waveform 500 (FIG. 5) is encoded in memory 170 as stored waveform 172. Waveform 600 (FIG. 6) is encoded in memory 170 as stored waveform 173. Waveform 700 (FIG. 7) is encoded in memory 170 as waveform stored 174. Waveform 800 (FIG. 8) is encoded in memory 170 as stored waveform 175. Waveform 900 (FIG. 9) is encoded in memory 170 as stored waveform 176. Waveform 1000 (FIG. 10) is encoded in memory 170 as stored waveform 177.

In the illustrated embodiment of FIG. 1, host computers 102, 104, and 106, are connected to fabric 110 utilizing communication links 103, 105, and 107, respectively. Communication links 103, 105, and 107, may utilize any type of I/O protocol, for example, Fibre Channel ("FC"), a direct attachment to fabric 110 or one or more signal lines used by host computers 102, 104, and 106, to transfer information to and from fabric 110.

In certain embodiments, fabric 110 includes, for example, one or more FC switches 115. In certain embodiments, those one or more switches 115 comprise one or more conventional router switches. In the illustrated embodiment of FIG. 1, one or more switches 115 interconnect host computers 102, 104, and 106, to system controller 120 via communication link 117. Communication link 117 may utilize any type of I/O interface, for example, Fibre Channel, Infiniband, Gigabit Ethernet, Ethernet, TCP/IP, iSCSI, SCSI I/O interface or one or more signal lines used by FC switch 115 to transfer information through to and from system controller 120, and subsequently data storage media 130, 140, 150, and 160. In other embodiments, one or more host computers, such as for example and without limitation host computers 102, 104, and 106, communicate directly with system controller 120 using communication links 103, 105, and 107, respectively.

Figure 2:
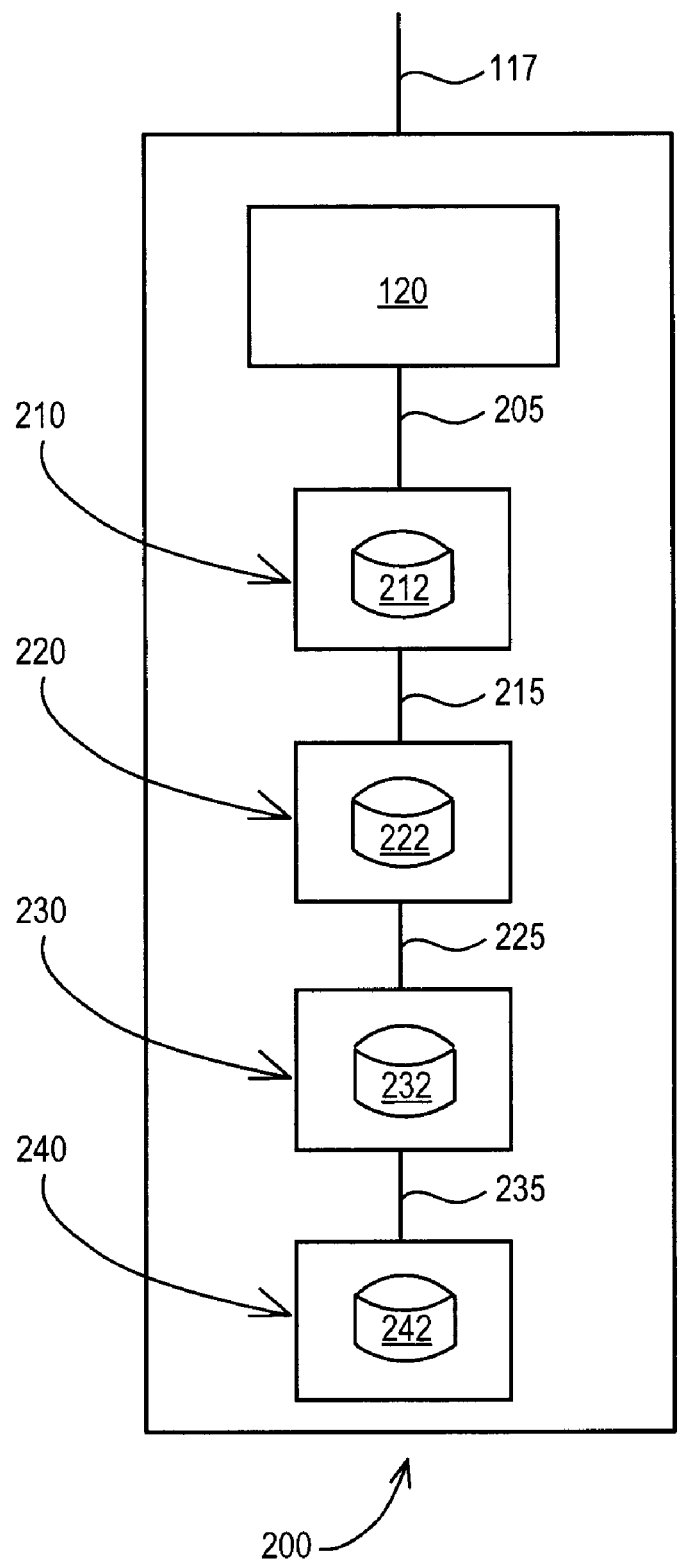
FIG. 2 is a block diagram showing a system controller in communication with a plurality of enclosures, wherein each enclosure comprises a plurality of data storage media.

In the illustrated embodiment of FIG. 2, Applicants' system controller 120 communicates with enclosures 210, 220, 230, and 240, using communication links 205, 215, 225, and 235, respectively. In certain embodiments, communication links 205, 215, 225, and 235, utilize a Fibre Channel protocol. In the illustrated embodiment of FIG. 2, enclosure 210 comprises a plurality of data storage media 212, enclosure 220 comprises a plurality of data storage media 222, enclosure 230 comprises a plurality of data storage media 232, and enclosure 240 comprises a plurality of data storage media 242.

As those skilled in the art will appreciate, information storage and retrieval system 200 further comprises additional elements, such as and without limitation one or more host adapters, one or more device adapters, a data cache, non-volatile storage, and the like.

Figure 3:
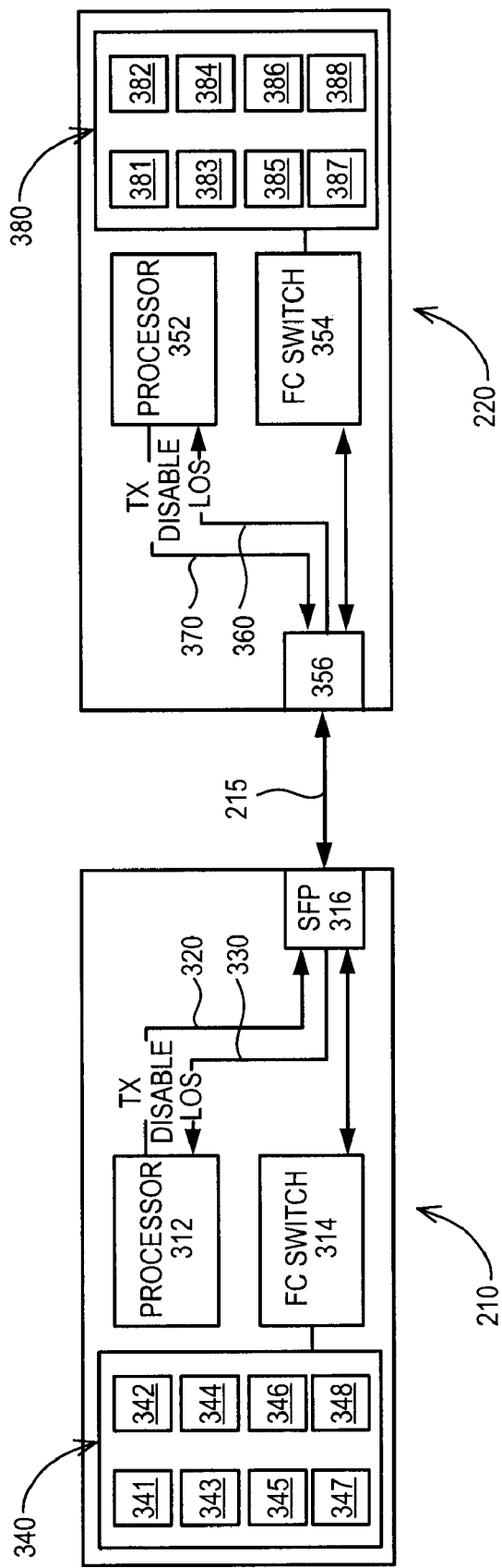
FIG. 3 is a block diagram illustrating a first enclosure in communication with a second enclosure.

FIG. 3 shows a first enclosure 210 in (FIGS. 2, 3) in communication with a second enclosure 220 (FIGS. 2, 3) via communication link 215. In the illustrated embodiment of FIG. 3, enclosure 210 comprises processor 312, Fibre Channel switch 314, small form pluggable adapter ("SFP") 316, and memory 340. Processor 312 can provide a Transmit (TX) Disable signal to SFP adapter 316 thereby discontinuing transmissions to enclosure 220 via communication link 320. SFP 316 can provide a loss of sync (LOS) signal to processor 312 via LOS communication link 330. Waveform 400 (FIG. 4) is encoded in memory 340 as stored waveform 341. Waveform 500 (FIG. 5) is encoded in memory 340 as stored waveform 342. Waveform 600 (FIG. 6) is encoded in memory 340 as stored waveform 343. Waveform 700 (FIG. 7) is encoded in memory 340 as stored waveform 344. Waveform 800 (FIG. 8) is encoded in memory 340 as stored waveform 345. Waveform 900 (FIG. 9) is encoded in memory 340 as stored waveform 346. Waveform 1000 (FIG. 10) is encoded in memory 340 as stored waveform 347. Instructions 348 are encoded in memory 340.

In the illustrated embodiment of FIG. 3, enclosure 220 comprises processor 352, Fibre Channel switch 354, small form pluggable adapter ("SFP") 356, and memory 380. Processor 352 can provide a TX Disable signal to SFP adapter 356 thereby discontinuing transmissions to enclosure 210 via communication link 370. SFP 356 can provide a loss of sync signal to processor 352 via LOS communication link 360.

Waveform 400 (FIG. 4) is encoded in memory 380 as stored waveform 381. Waveform 500 (FIG. 5) is encoded in memory 380 as stored waveform 382. Waveform 600 (FIG. 6) is encoded in memory 380 as stored waveform 383. Waveform 700 (FIG. 7) is encoded in memory 380 as stored waveform 384. Waveform 800 (FIG. 8) is encoded in memory 380 as stored waveform 385. Waveform 900 (FIG. 9) is encoded in memory 380 as stored waveform 386. Waveform 1000 (FIG. 10) is encoded in memory 380 as stored waveform 387. Instructions 388 are encoded in memory 380.

Figure 4:
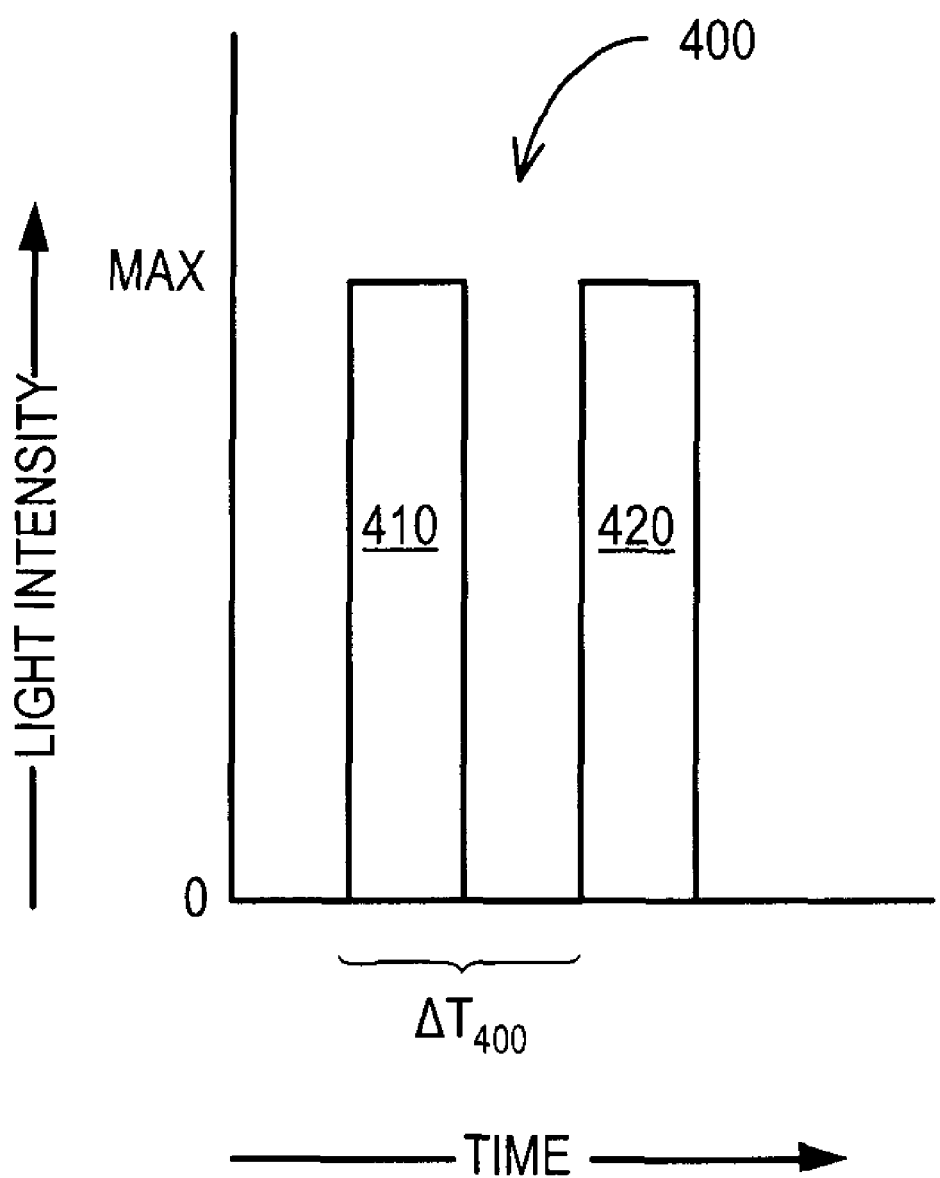
FIG. 4 is a block diagram illustrating a waveform comprising a frequency $F_{Base}$.

FIG. 4 illustrates a waveform 400, wherein waveform 400 comprises first signal 410 and a second signal 420. In certain embodiments, signal 410 comprises a light signal. In certain embodiments, signal 410 comprises a light signal formed using a lasing device. In certain embodiments, signal 420 comprises a light signal. In certain embodiments, signal 420 comprises a light signal formed using a lasing device. The time interval between the rising edge of signal 410 and the rising edge of 420, i.e. $\Delta T_{400}$, defines a frequency $F_{Base}$. Reference herein to a waveform comprises a frequency $F_{Base}$ or $F_B$ refer to waveform 400.

Figure 5:
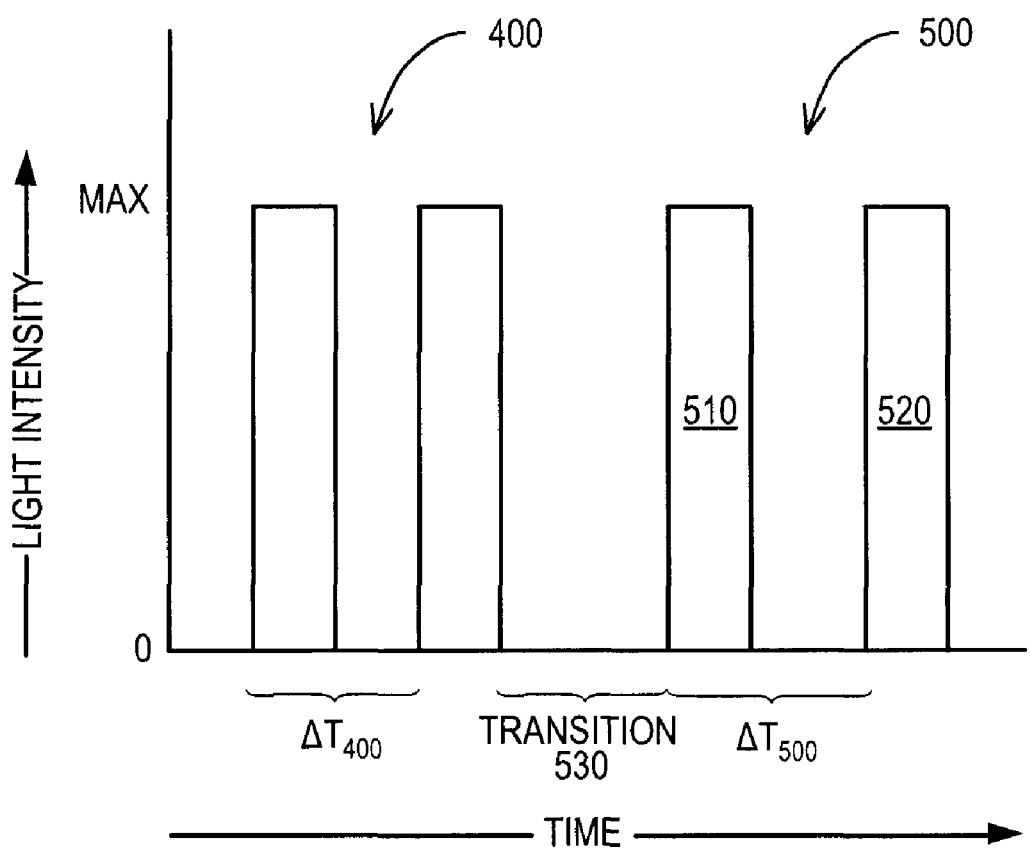
FIG. 5 is a block diagram illustrating a waveform comprising a frequency $F_0$.

FIG. 5 illustrates waveform 400 in combination with waveform 500, wherein waveform 500 comprises a first signal 510 and a second signal 520. In certain embodiments, signal 510 comprises a light signal. In certain embodiments, signal 510 comprises a light signal formed using a lasing device. In certain embodiments, signal 520 comprises a light signal. In certain embodiments, signal 520 comprises a light signal formed using a lasing device. The time interval between the rising edge of signals 510 and the rising edge of 520, i.e. $\Delta T_{500}$, defines a frequency $F_0$.

In the illustrated embodiment of FIG. 5, waveform 400 is separated from waveform 500 by Transition 530. In certain embodiments, Applicants' method waveform 400 in combination with waveform 500 as a data bit comprising a first value.

Figure 6:
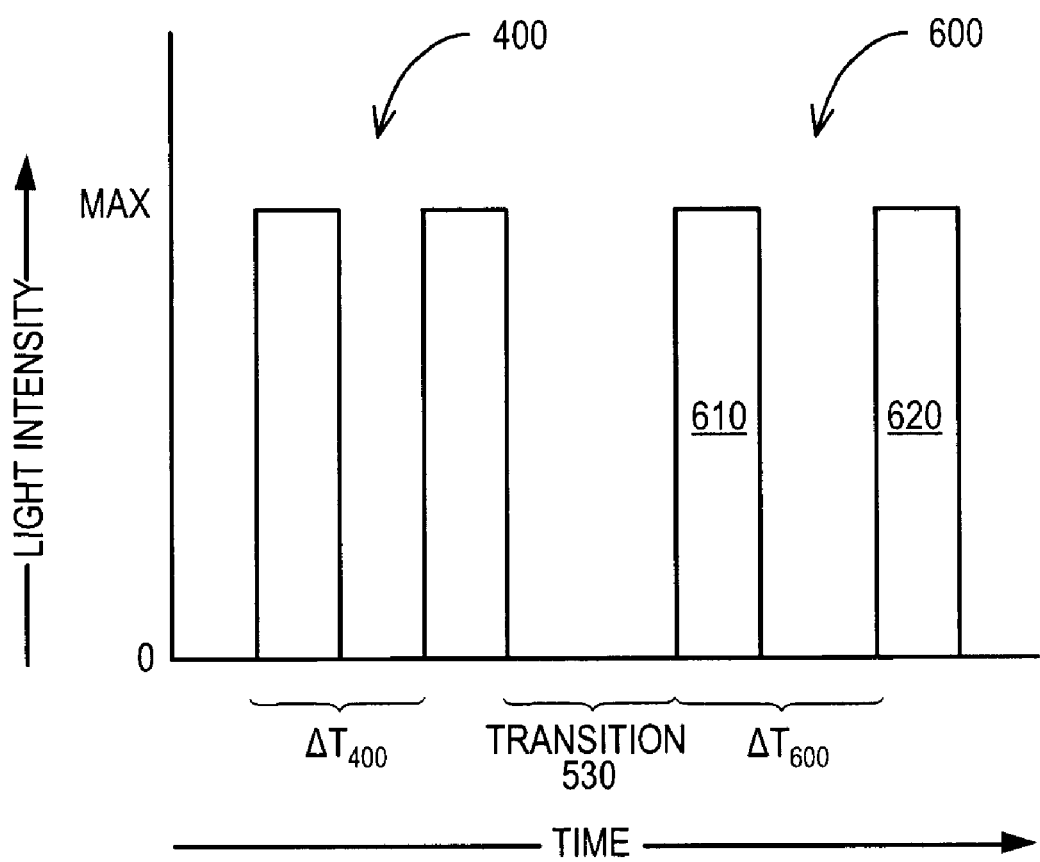
FIG. 6 is a block diagram illustrating a waveform comprising a frequency $F_1$.

FIG. 6 illustrates waveform 400 in combination with waveform 600, wherein waveform 600 comprises a first signal 610 and a second signal 620. In certain embodiments, signal 610 comprises a light signal. In certain embodiments, signal 610 comprises a light signal formed using a lasing device. In certain embodiments, signal 620 comprises a light signal. In certain embodiments, signal 620 comprises a light signal formed using a lasing device. The time interval between the rising edge of signals 610 and the rising edge of 620, i.e. $\Delta T_{600}$, defines a frequency $F_1$.

In the illustrated embodiment of FIG. 6, waveform 400 is separated from waveform 600 by Transition 530. In certain embodiments, Applicants' method decodes waveform 400 in combination with waveform 600 as a data bit comprising a second value.

Figure 7:
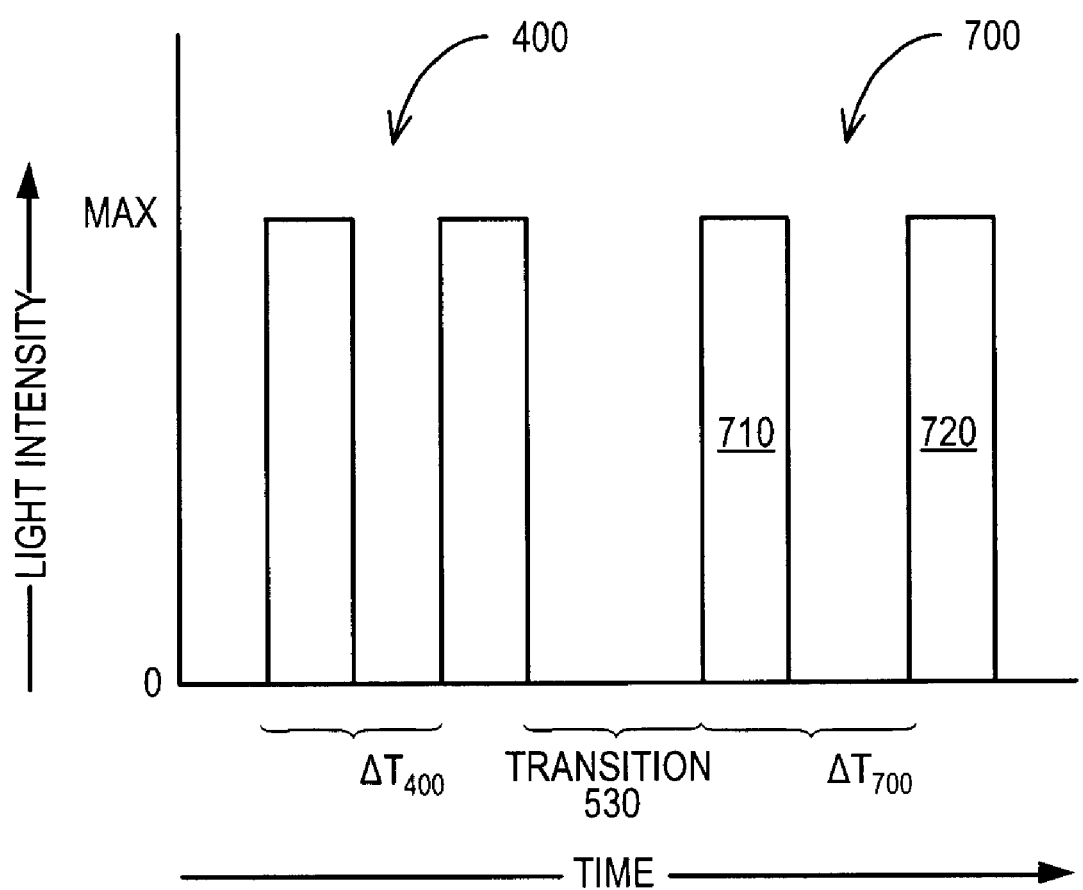
FIG. 7 is a block diagram illustrating a waveform comprising a frequency $F_{STR}$.

FIG. 7 illustrates waveform 400 in combination with waveform 700, wherein waveform 700 comprises a first signal 710 and a second signal 720. In certain embodiments, signal 710 comprises a light signal. In certain embodiments, signal 710 comprises a light signal formed using a lasing device. In certain embodiments, signal 720 comprises a light signal. In certain embodiments, signal 720 comprises a light signal formed using a lasing device. The time interval between the rising edge of signals 710 and the rising edge of 720, i.e. $\Delta T_{700}$, defines a frequency $F_{STR}$.

In the illustrated embodiment of FIG. 7, waveform 400 is separated from waveform 700 by Transition 530. In certain embodiments, Applicants' method decodes waveform 400 in combination with waveform 700 as a signal that an interconnected enclosure has data to transmit.

Figure 8:
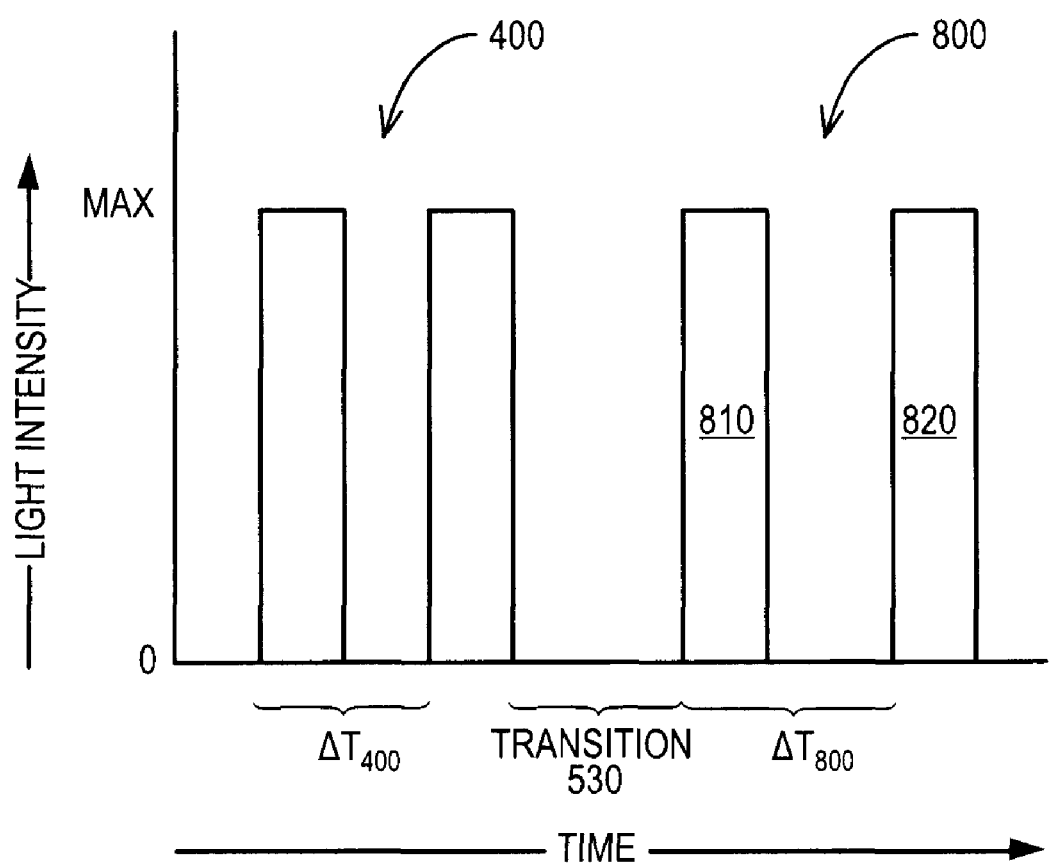
FIG. 8 is a block diagram illustrating a waveform comprising a frequency $F_{STP}$.

FIG. 8 illustrates waveform 400 in combination with waveform 800, wherein waveform 800 comprises a first signal 810 and a second signal 820. In certain embodiments, signal 810 comprises a light signal. In certain embodiments, signal 810 comprises a light signal formed using a lasing device. In certain embodiments, signal 820 comprises a light signal. In certain embodiments, signal 820 comprises a light signal formed using a lasing device. The time interval between the rising edge of signals 810 and the rising edge of 820, i.e. $\Delta T_{800}$, defines a frequency $F_{STP}$.

In the illustrated embodiment of FIG. 8, waveform 400 is separated from waveform 800 by Transition 530. In certain embodiments, Applicants' method decodes waveform 400 in combination with waveform 800 as a signal from an initiating enclosure that there is no additional data to transmit.

Figure 9:
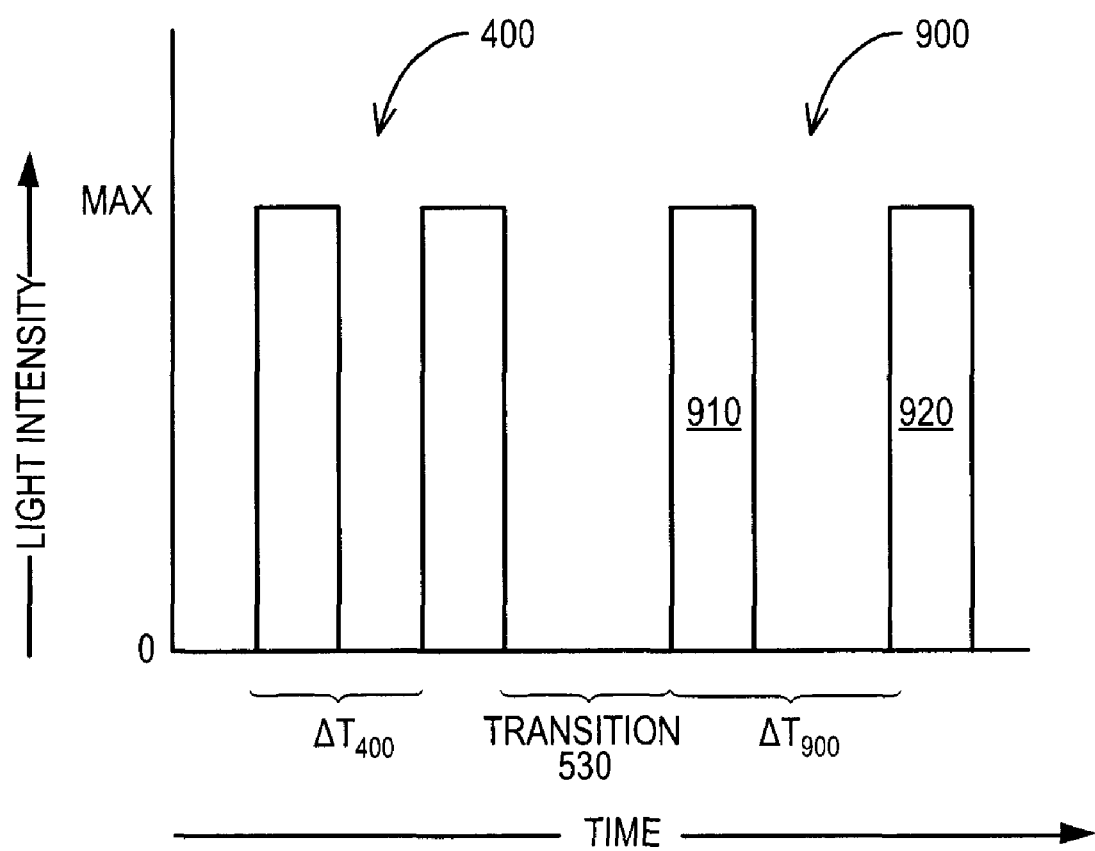
FIG. 9 is a block diagram illustrating a waveform comprising a frequency $F_{CA}$.

FIG. 9 illustrates waveform 400 in combination with waveform 900, wherein waveform 900 comprises a first signal 910 and a second signal 920. In certain embodiments, signal 910 comprises a light signal. In certain embodiments, signal 910 comprises a light signal formed using a lasing device. In certain embodiments, signal 920 comprises a light signal. In certain embodiments, signal 920 comprises a light signal formed using a lasing device. The time interval between signals the rising edge of 910 and the rising edge of 920, i.e. $\Delta T_{900}$, defines a frequency $F_{CA}$.

In the illustrated embodiment of FIG. 9, waveform 400 is separated from waveform 900 by Transition 530. In certain embodiments, Applicants' method decodes waveform 400 in combination with waveform 900 as a signal that a responding enclosure has received waveform 700 (FIG. 7) and is ready to capture data.

Figure 10:
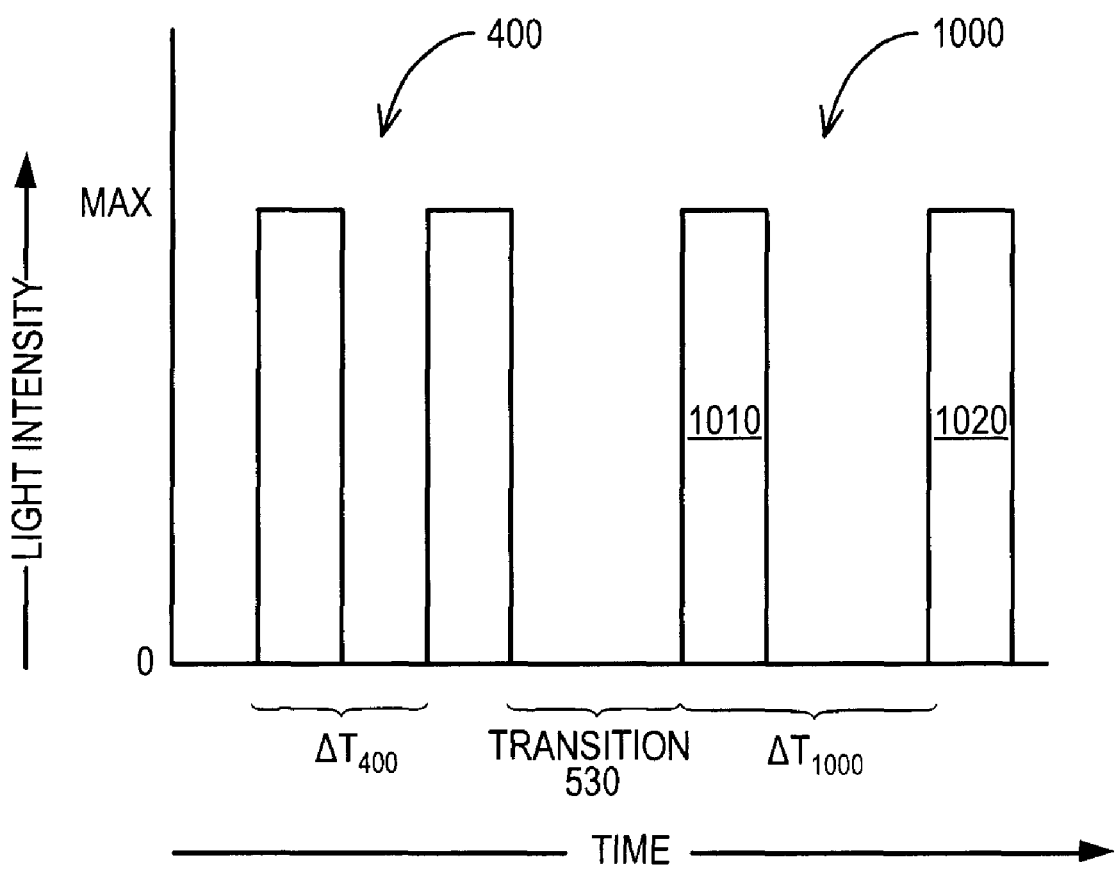
FIG. 10 is a block diagram illustrating a waveform comprising a frequency $F_{DA}$.

FIG. 10 illustrates waveform 400 in combination with waveform 1000, wherein waveform 1000 comprises a first signal 1010 and a second signal 1020. In certain embodiments, signal 1010 comprises a light signal. In certain embodiments, signal 1010 comprises a light signal formed using a lasing device. In certain embodiments, signal 1020 comprises a light signal. In certain embodiments, signal 1020 comprises a light signal formed using a lasing device. The time interval between the rising edge of signals 1010 and the rising edge of 1020, i.e. $\Delta T_{1000}$, defines a frequency $F_{DA}$.

In the illustrated embodiment of FIG. 10, waveform 400 is separated from waveform 1000 by Transition 530. In certain embodiments, Applicants' method decodes waveform 400 in combination with waveform 1000 as a signal that a responding enclosure has received an entire byte of data.

Figure 11:
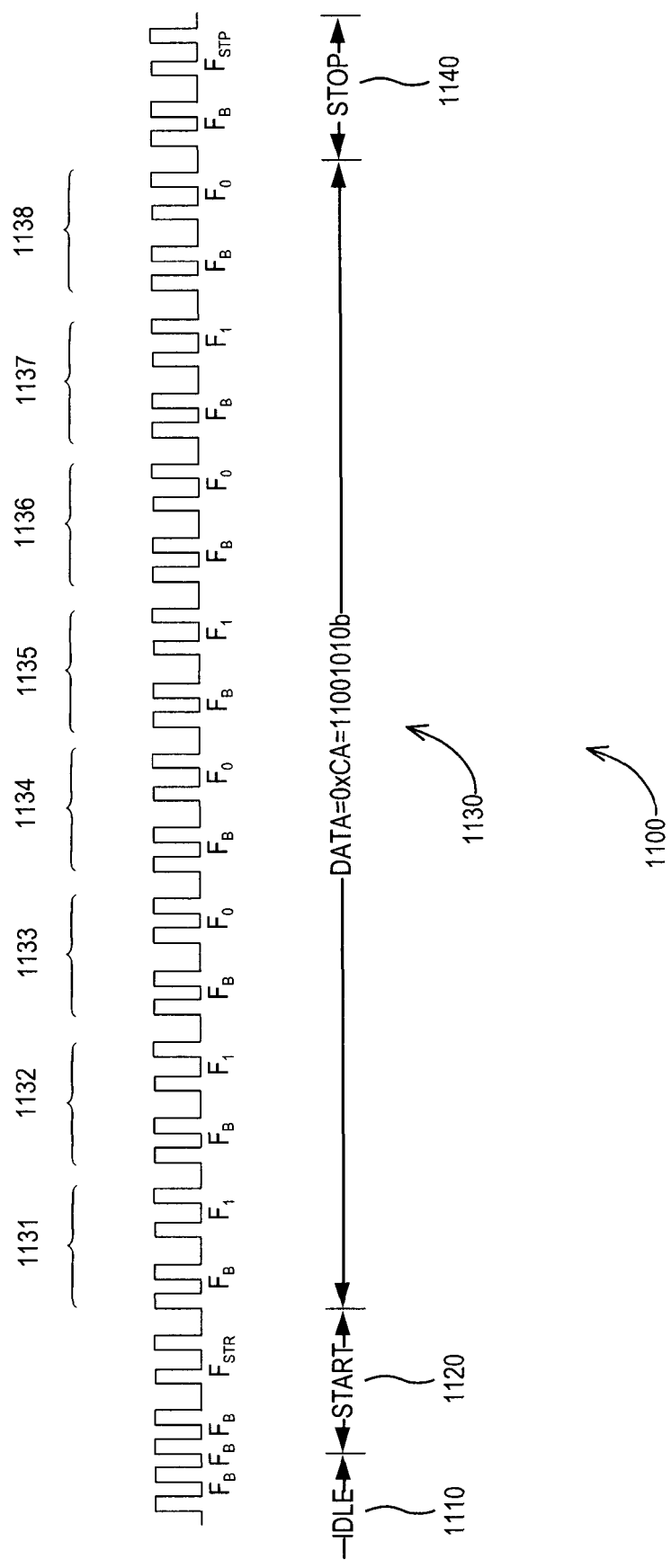
FIG. 11 shows a plurality of waveforms sent from a first enclosure to a second enclosure.
Figure 12:
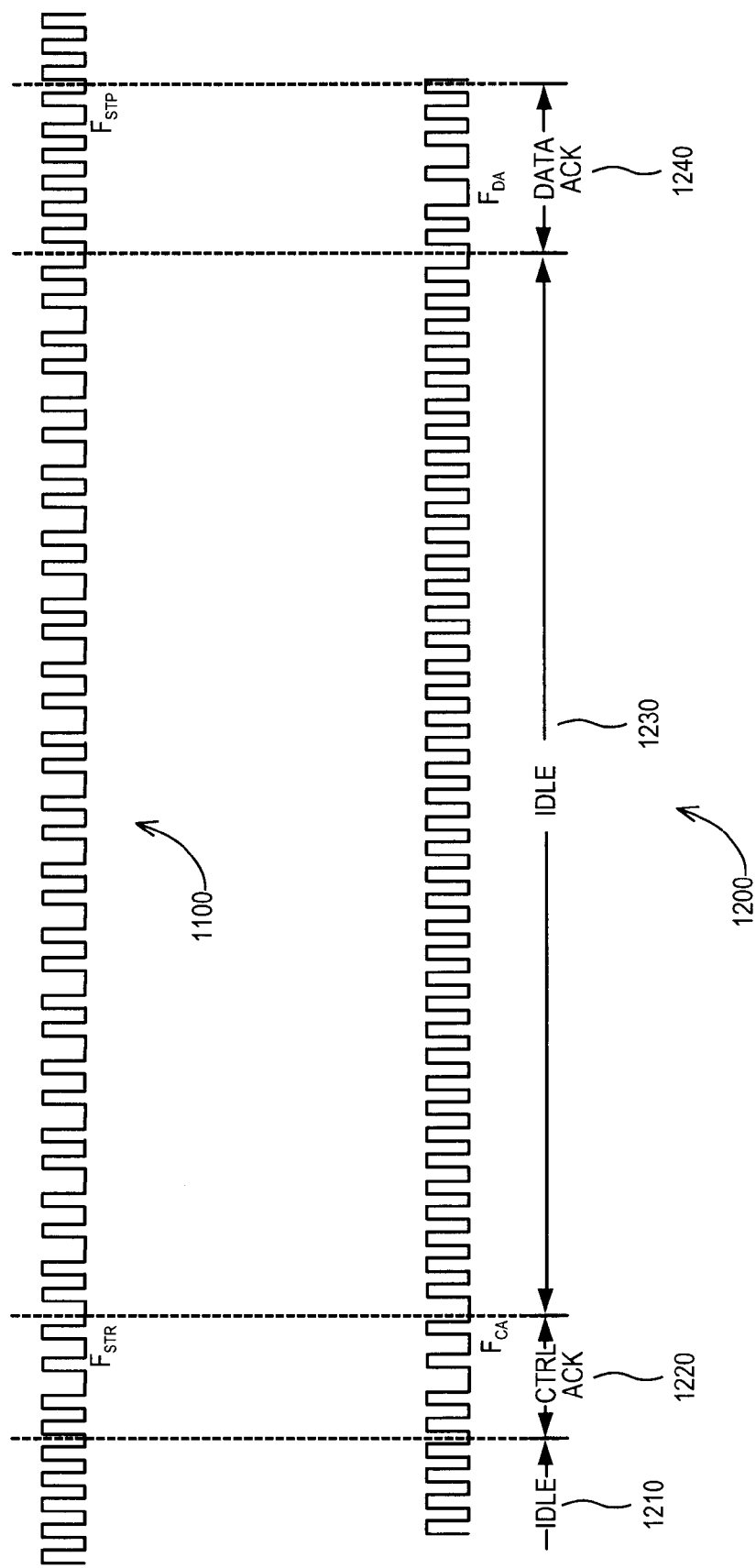
FIG. 12 shows a plurality of waveforms responding to the waveforms of FIG. 11 sent by the second enclosure to the first enclosure.

FIG. 11 illustrates a composite waveform 1100 transmitted by an initiating enclosure, such as for example and without limitation enclosure 210 (FIGS. 2, 3) to a responding enclosure, such as for example and without limitation enclosure 220 (FIGS. 2, 3). FIG. 12 illustrates composite waveform 1200 transmitted by the responding enclosure in response to receiving waveform 1100 (FIG. 11).

Referring once again to FIG. 1, waveform 1100 comprises a data portion 1130 comprising data waveforms 1131, 1132, 1133, 1134, 1135, 1136, 1137, and 1138. Applicants' method decodes data portion 1130 of waveform 1100 to comprise a byte of data comprising data bits 11001010.

Data waveform 1131 comprises a waveform comprising frequency $F_1$, and is decoded by the responding enclosure as a "1". Data waveform 1132 comprises a waveform comprising frequency $F_1$, and is decoded by the responding enclosure as a "1". Data waveform 1133 comprises a waveform comprising frequency $F_0$, and is decoded by the responding enclosure as a "0". Data waveform 1134 comprises a waveform comprising frequency $F_0$, and is decoded by the responding enclosure as a "0". Data waveform 1135 comprises a waveform comprising frequency $F_1$, and is decoded by the responding enclosure as a "1". Data waveform 1136 comprises a waveform comprising frequency $F_0$, and is decoded by the responding enclosure as a "0". Data waveform 1137 comprises a waveform comprising frequency $F_1$, and is decoded by the responding enclosure as a "1". Data waveform 1138 comprises a waveform comprising frequency $F_0$, and is decoded by the responding enclosure as a "0".

Figure 13:
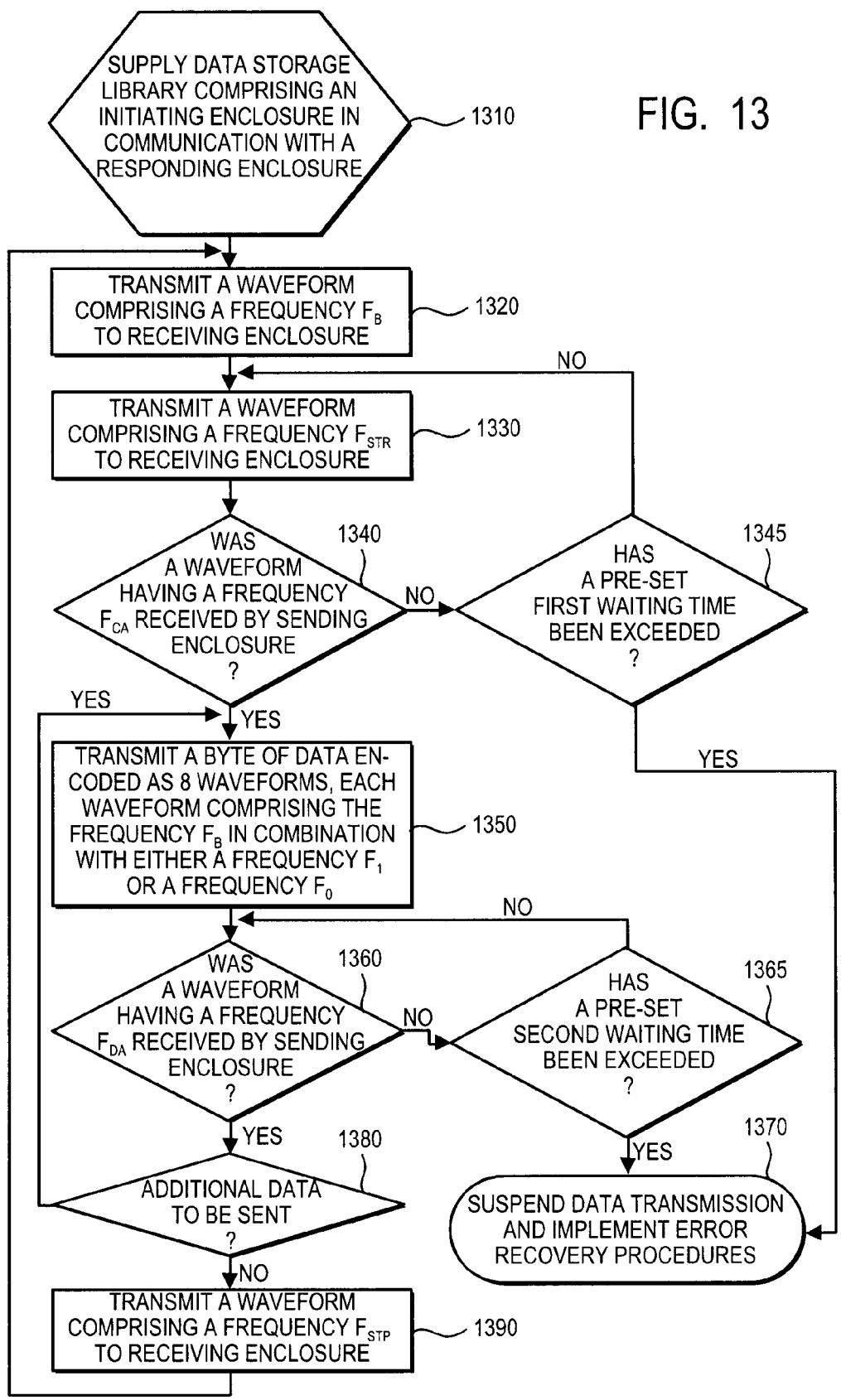
FIG. 13 is a flow chart summarizing certain steps of Applicants' method.

FIG. 13 illustrates the steps of Applicants' method implemented by an initiating enclosure. Referring now to FIG. 13, in step 1310 the method supplies a data storage and retrieval system comprising an initiating enclosure and a responding enclosure. In step 1320, the initiating enclosure continuously transmits a waveform comprising a frequency $F_B$ to the responding enclosure. Referring again to FIG. 11, waveform portion 1110 comprises waveform 400 (FIG. 4) comprising only a frequency $F_{Base}$ or $F_B$.

Referring again to FIG. 13, in step 1330 the initiating enclosure transmits a waveform comprising a frequency $F_{STR}$, such as waveform 700 (FIG. 7). In certain embodiments, step 1330 is performed by a processor disposed in the initiating enclosure. In certain embodiments, step 1330 is performed by a system controller, such as system controller 120 (FIGS. 1, 2).

In step 1340, the initiating enclosure determines if a waveform comprising a frequency $F_{CA}$, such as waveform 900 (FIG. 9), was received from the responding enclosure. In certain embodiments, step 1340 is performed by a processor disposed in the initiating enclosure. In certain embodiments, step 1340 is performed by a system controller, such as system controller 120 (FIGS. 1, 2).

Referring to FIG. 11, the initiating enclosure transmits a waveform 1120 comprising a frequency $F_{STR}$. Referring to FIG. 12, in response to receiving the waveform 1120, the responding enclosure transmits a waveform 1210 comprising a frequency $F_{CA}$.

If the method determines in step 1340 that the initiating enclosure did not receive a waveform comprising a frequency $F_{CA}$, then the method transitions from step 1340 to step 1345 wherein the method determines if a first waiting time has been exceeded. In certain embodiments, step 1345 is performed by a processor disposed in the initiating enclosure. In certain embodiments, step 1345 is performed by a system controller, such as system controller 120 (FIGS. 1, 2).

If the method determines in step 1345 that a first waiting time has not been exceeded, then the method transitions from step 1345 to step 1330 and continues as described herein. Alternatively, if the method determines in step 1345 that a first waiting time has been exceeded, then the method transitions from step 1345 to step 1370 wherein the method suspends data transmission and implements error recovery procedures.

In certain embodiments, step 1370 is performed by a processor disposed in the initiating enclosure. In certain embodiments, step 1370 is performed by a system controller, such as system controller 120 (FIGS. 1, 2). In the event the initiating enclosure stops transmitting waveforms in step 1370, then the responding enclosure will detect a loss of sync with the initiating enclosure, and the responding enclosure will also suspend data transmission and implement error recovery procedures.

If the method determines in step 1340 that the initiating enclosure received a waveform comprising a frequency $F_{CA}$, then the method transitions from step 1340 to step 1350 wherein the method transmits a byte of data encoded as eight data waveforms, wherein each data waveform comprises a waveform 400 in combination with either a waveform 500 (FIG. 5) or a waveform 600 (FIG. 6). In certain embodiments, step 1350 is performed by a processor disposed in the initiating enclosure. In certain embodiments, step 1350 is performed by a system controller, such as system controller 120 (FIGS. 1, 2).

In step 1360, the method determines if a waveform comprising a frequency $F_{DA}$ was received by the initiating enclosure. In certain embodiments, step 1360 is performed by a processor disposed in the initiating enclosure. In certain embodiments, step 1360 is performed by a system controller, such as system controller 120 (FIGS. 1, 2). Referring to FIG. 11, the initiating enclosure transmits a waveform 1130 comprising eight data waveforms. Referring to FIG. 12, in response to receiving the eight data waveforms, the responding enclosure transmits a waveform 1230 comprising a frequency $F_{DA}$.

If the method determines in step 1360 that if a waveform comprising a frequency $F_{DA}$ was not received by the initiating enclosure, then the method transitions from step 1360 to step 1365 wherein the method determines if a pre-set second waiting time has been exceeded. In certain embodiments, step 1365 is performed by a processor disposed in the initiating enclosure. In certain embodiments, step 1365 is performed by a system controller, such as system controller 120 (FIGS. 1, 2).

If the method determines in step 1365 that a pre-set second waiting time has not been exceeded, then the method continues to monitor for receipt by the initiating enclosure of a waveform comprising a frequency $F_{DA}$. Alternatively, if the method determines in step 1365 that a pre-set second waiting time has been exceeded, then the method transitions from step 1365 to step 1370 wherein the method suspends data transmission and implements error recovery procedures.

In certain embodiments, step 1370 is performed by a processor disposed in the initiating enclosure. In certain embodiments, step 1370 is performed by a system controller, such as system controller 120 (FIGS. 1, 2). In the event the initiating enclosure stops transmitting waveforms in step 1370, then the responding enclosure will detect a loss of sync with the initiating enclosure, and the responding enclosure will also suspend data transmission and implement error recovery procedures. In certain embodiments, the method in step 1370 transmits a series of $F_{STP}$ signals, thereby instructing the responding enclosure that data transmission has been suspended.

If the method determines in step 1360 that a waveform comprising a frequency $F_{DA}$ was received by the initiating enclosure, then the method transitions from step 1360 to step 1380 wherein the method determines if the initiating enclosure has additional data to transmit to the responding enclosure. In certain embodiments, step 1380 is performed by a processor disposed in the initiating enclosure. In certain embodiments, step 1380 is performed by a system controller, such as system controller 120 (FIGS. 1, 2).

If the method determines in step 1380 that the initiating enclosure has additional data to transmit to the responding enclosure, then the method transitions from step 1380 to step 1350 and continues as described herein. Alternatively, if the method determines in step 1380 that the initiating enclosure does not have additional data to transmit to the responding enclosure, then the method transitions from step 1380 to step 1390 wherein the method transmits a waveform, such as waveform 800 (FIG. 8), comprising a frequency $F_{STP}$ by the initiating enclosure. In certain embodiments, step 1390 is performed by a processor, such as system controller 120 (FIGS. 1, 2).

Figure 14:
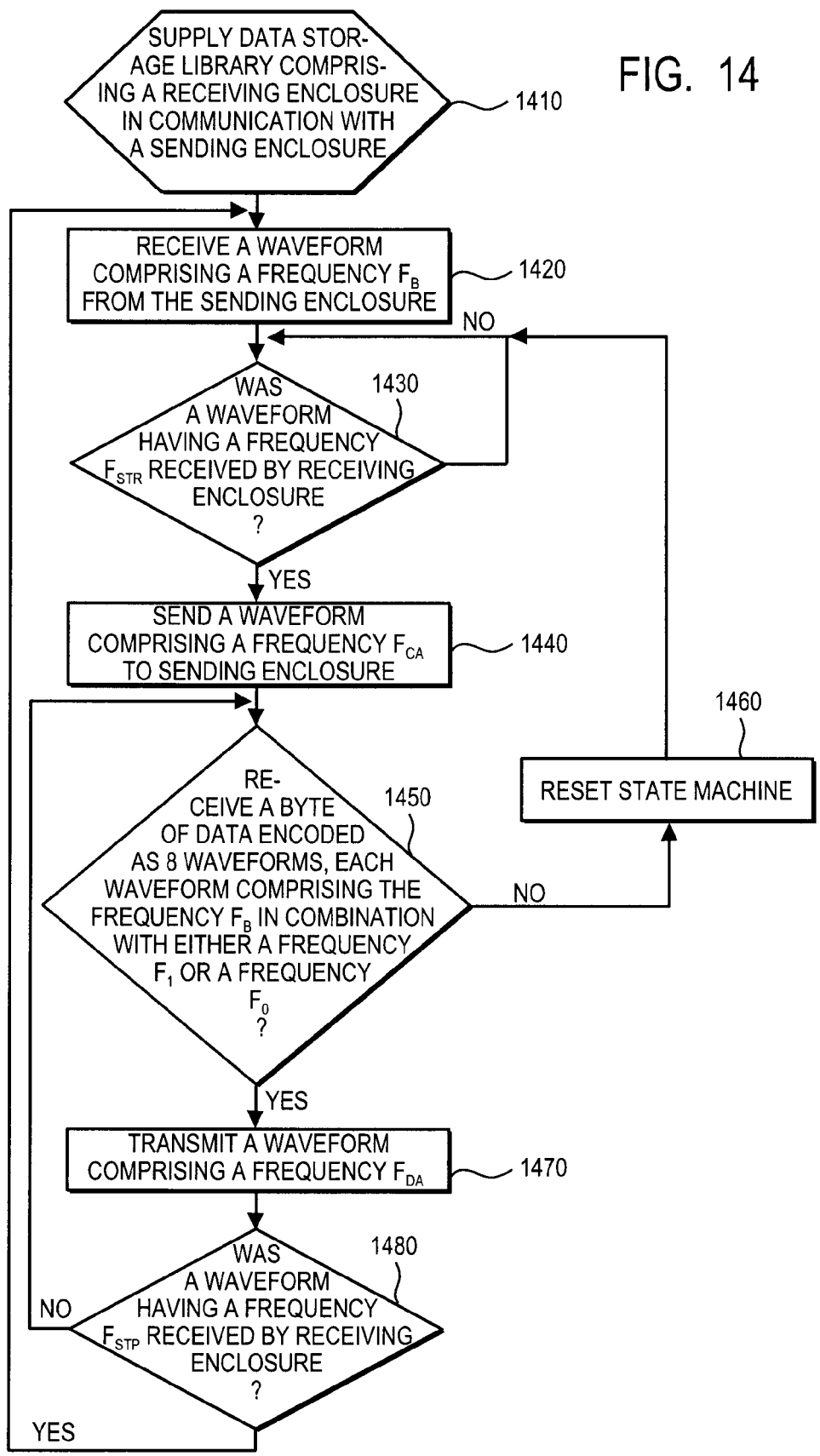
FIG. 14 is a flow chart summarizing additional steps of Applicants' method.

FIG. 14 illustrates the steps of Applicants' method implemented by an initiating enclosure. Referring now to FIG. 14, in step 1410 the method supplies a data storage library comprising a responding enclosure in communication with an initiating enclosure. In step 1420, the responding enclosure continuously receives a waveform comprising a frequency $F_B$, and in response continuously transmits the same waveform. In certain embodiments, step 1420 is performed by a processor disposed in the responding enclosure. Referring again to FIGS. 11 and 12, in response to continuously receiving waveform 1110 the responding enclosure transmits waveform 1210 comprising waveform 400 (FIG. 4) comprising only a frequency $F_{Base}$ or $F_B$. In certain embodiments, step 1420 is performed by a processor disposed in the responding enclosure. In certain embodiments, step 1420 is performed by a system controller, such as system controller 120 (FIGS. 1, 2).

Referring again to FIG. 14, in step 1430 the method determines if the responding enclosure receives a waveform comprising a frequency $F_{STR}$, such as waveform 700 (FIG. 7). In certain embodiments, step 1430 is performed by a processor disposed in the responding enclosure. In certain embodiments, step 1430 is performed by a system controller, such as system controller 120 (FIGS. 1, 2).

If the method does not determine in step 1430 that the responding enclosure has received a waveform comprising a frequency $F_{STR}$, then the method continues to monitor for receipt of a waveform comprising the frequency $F_{STR}$, such as waveform 700 (FIG. 7). Alternatively, if the method determines in step 1430 that the responding enclosure has received a waveform comprising a frequency $F_{STR}$, then the method transitions from step 1430 to step 1440 wherein the responding enclosure transmits a waveform comprising a frequency $F_{CA}$, such as waveform 900 (FIG. 9). In certain embodiments, step 1440 is performed by a processor disposed in the responding enclosure. In certain embodiments, step 1440 is performed by a system controller, such as system controller 120 (FIGS. 1, 2).

In step 1450, the method determines if the responding enclosure has received a byte of data encoded as eight data waveforms, wherein each data waveform comprises a waveform 400 in combination with either a waveform 500 (FIG. 5) or a waveform 600 (FIG. 6). In certain embodiments, step 1450 is performed by a processor disposed in the responding enclosure. In certain embodiments, step 1450 is performed by a system controller, such as system controller 120 (FIGS. 1, 2).

If the method determines in step 1450 that the responding enclosure did not receive a byte of data encoded as eight data waveforms, wherein each data waveform comprises a waveform 400 in combination with either a waveform 500 (FIG. 5) or a waveform 600 (FIG. 6), then the method transitions from step 1450 to step 1460 wherein the method resets the state machine for the responding enclosure. The method transitions from step 1460 to step 1430 and continues as described herein.

In certain embodiments, step 1460 is performed by a processor disposed in the responding enclosure. In certain embodiments, step 1460 is performed by a system controller, such as system controller 120 (FIGS. 1, 2). In the event the responding enclosure stops transmitting waveforms in step 1460, then the initiating enclosure will detect a loss of sync with the responding enclosure, and the initiating enclosure will also suspend data transmission and implement error recovery procedures.

If the method determines in step 1450 that the responding enclosure did receive a byte of data encoded as eight data waveforms, wherein each data waveform comprises a waveform 400 in combination with either a waveform 500 (FIG. 5) or a waveform 600 (FIG. 6), then the method transitions from step 1450 to step 1470 wherein the method transmits a waveform comprising a frequency $F_{DA}$, such as waveform 1000 (FIG. 10). In certain embodiments, step 1470 is performed by a processor disposed in the responding enclosure. In certain embodiments, step 1470 is performed by a system controller, such as system controller 120 (FIGS. 1, 2).

In step 1480, the method determines if the responding enclosure receives a waveform, such as waveform 800 (FIG. 8), comprising a frequency $F_{STP}$. In certain embodiments, step 1480 is performed by a processor disposed in the responding enclosure. In certain embodiments, step 1480 is performed by a system controller, such as system controller 120 (FIGS. 1, 2).

If the method determines in step 1480, that the responding enclosure did not receive a waveform, such as waveform 800 (FIG. 8), comprising a frequency $F_{STP}$, then the method transitions from step 1480 to step 1450 and continues as described herein. Alternatively, if the method determines in step 1480, that the responding enclosure did receive a waveform, such as waveform 800 (FIG. 8), comprising a frequency $F_{STP}$, then the method transitions from step 1480 to step 1420 and continues as described herein.

In certain embodiments, individual steps recited in FIGS. 13, and/or 14, may be combined, eliminated, or reordered.

In certain embodiments, Applicants' invention includes instructions, such as instructions 178 (FIG. 1), and/or instructions 348 (FIG. 3), and/or instructions 388 (FIG. 3), residing in computer readable medium, such as for example memory 170 (FIG. 1), and/or memory 340 (FIG. 3), and/or memory 380 (FIG. 3), respectively, wherein those instructions are executed by a processor, such as processor 128 (FIG. 1), and/or processor 312 (FIG. 3), and/or processor 352 (FIG. 3), respectively, to perform one or more of steps 1320, 1330, 1340, 1345, 1350, 1360, 1365, 1370, 1380, and/or 1390, recited in FIG. 13, and/or one or more of steps 1420, 1430, 1440, 1450, 1460, 1470, and/or 1480, recited in FIG. 14.

In other embodiments, Applicants' invention includes instructions residing in any other computer program product, where those instructions are executed by a computer external to, or internal to, Applicants' data storage library to perform one or more of steps 1320, 1330, 1340, 1345, 1350, 1360, 1365, 1370, 1380, and/or 1390, recited in FIG. 13, and/or one or more of steps 1420, 1430, 1440, 1450, 1460, 1470, and/or 1480, recited in FIG. 14. In either case, the instructions may be encoded in a computer readable medium such as, for example, a magnetic information storage medium, an optical information storage medium, an electronic information storage medium, and the like. By "electronic storage media," Applicants mean, for example and without limitation, one or more devices, such as and without limitation, a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to communicate information within a data storage library comprising a plurality of enclosures, comprising the steps of:

defining and saving a first waveform comprising a frequency $F_B$;

defining and saving a second waveform comprising a frequency $F_0$, wherein said second waveform is decoded to mean a bit comprising a first value, wherein said frequency $F_0$ differs from said frequency $F_B$;

defining and saving a third waveform comprising a frequency $F_1$, wherein said third waveform is decoded to mean a bit comprising a second value, and wherein said frequency $F_1$ differs from both said frequency $F_0$ and said frequency $F_B$; and transmitting by an initiating enclosure a byte of data encoded as eight data waveforms, wherein each of the eight data waveforms comprises said frequency $F_B$ in combination with either said frequency $F_1$ or said frequency $F_0$.

2. The method of claim 1, further comprising the steps of:

defining and saving a fourth waveform comprising a frequency $F_{STR}$, wherein said frequency $F_{STR}$ differs from each of said frequency $F_1$, said frequency $F_0$, and said frequency $F_B$; and transmitting said fourth waveform by said initiating enclosure prior to transmitting said data waveforms.

3. The method of claim 2, further comprising the steps of:
defining and saving a fifth waveform comprising a frequency $F_{CA}$, wherein said frequency $F_{CA}$ differs from each of said frequency $F_1$, said frequency $F_0$, said frequency $F_B$, and said frequency $F_{STR}$;
determining by said initiating enclosure if said fifth waveform was received after transmitting said fourth waveform; and
operative if said fifth waveform was received by said initiating enclosure after transmitting said fourth waveform, performing said transmitting data waveforms step.

4. The method of claim 3, further comprising the steps of:
defining and saving a sixth waveform comprising a frequency $F_{DA}$, wherein said frequency $F_{DA}$ differs from each of said frequency $F_1$, said frequency $F_0$, said frequency $F_B$, said frequency $F_{STR}$, and said frequency $F_{CA}$;
determining by said initiating enclosure if said sixth waveform was received after transmitting said data waveforms; and
operative if said sixth waveform was not received after transmitting said data waveforms, discontinuing transmissions by said initiating enclosure.

5. The method of claim 4, further comprising the steps of:
defining and saving a seventh waveform comprising a frequency $F_{STP}$, wherein said frequency $F_{STP}$ differs from each of said frequency $F_1$, said frequency $F_0$, said frequency $F_B$, said frequency $F_{STR}$, said frequency $F_{DA}$, and said frequency $F_{CA}$; and
operative if said sixth waveform was received by said initiating enclosure after transmitting said data waveforms, transmitting said seventh waveform by said initiating enclosure.

6. A method to communicate information within a data storage library comprising a plurality of enclosures, comprising the steps of:
defining and saving a first waveform comprising a frequency $F_B$;
defining and saving a second waveform comprising a frequency $F_0$, wherein said second waveform is decoded to mean a bit comprising a first value, wherein said frequency $F_0$ differs from said frequency $F_B$;
defining and saving a third waveform comprising a frequency $F_1$, wherein said third waveform is decoded to mean a bit comprising a second value, and wherein said frequency $F_1$ differs from both said frequency $F_0$ and said frequency $F_B$; and
receiving by a responding enclosure a byte of data encoded as eight data waveforms, wherein each of the data waveforms comprises said frequency $F_B$ in combination with either said frequency $F_1$ or said frequency $F_0$.

7. The method of claim 6, further comprising the steps of:
defining and saving a fourth waveform comprising a frequency $F_{STR}$, wherein said frequency $F_{STR}$ differs from each of said frequency $F_1$, said frequency $F_0$, and said frequency $F_B$; and
receiving said fourth waveform by said responding enclosure prior to receiving said data waveforms.

8. The method of claim 7, further comprising the steps of:
defining and saving a fifth waveform comprising a frequency $F_{CA}$, wherein said frequency $F_{CA}$ differs from each of said frequency $F_1$, said frequency $F_0$, said frequency $F_B$, and said frequency $F_{STR}$; and
transmitting said fifth waveform by said responding enclosure after receiving said fourth waveform and before receiving said data waveforms.

9. The method of claim 8, further comprising the steps of:
defining and saving a sixth waveform comprising a frequency $F_{DA}$, wherein said frequency $F_{DA}$ differs from each of said frequency $F_1$, said frequency $F_0$, said frequency $F_B$, said frequency $F_{STR}$, and said frequency $F_{CA}$; and
transmitting said sixth waveform by said responding enclosure after receiving said eight data waveforms.

10. The method of claim 9, further comprising the steps of:
defining and saving a seventh waveform comprising a frequency $F_{STP}$, wherein said frequency $F_{STP}$ differs from each of said frequency $F_1$, said frequency $F_0$, said frequency $F_B$, said frequency $F_{STR}$, said frequency $F_{DA}$, and said frequency $F_{CA}$; and
receiving said seventh waveform by said responding enclosure after transmitting said sixth waveform.

11. An initiating enclosure disposed in a data storage library and in communication with a responding enclosure disposed in said data storage library, said first enclosure comprising a processor and a non-transitory computer readable medium comprising an encoded first waveform comprising a frequency $F_B$, an encoded second waveform comprising a frequency $F_0$, an encoded third waveform comprising a frequency $F_1$, and computer readable program code disposed therein to communicate information within said data storage library, wherein said frequency $F_1$ differs from both said frequency $F_0$ and said frequency $F_B$, the computer readable program code comprising a series of computer readable program steps to effect transmitting a byte of data encoded as eight data waveforms, wherein each of the eight data waveforms comprises said frequency $F_B$ in combination with either said frequency $F_1$ or said frequency $F_0$.

12. The initiating enclosure of claim 11, further comprising a fourth waveform comprising a frequency $F_{STR}$ encoded in said non-transitory computer readable medium, wherein said frequency $F_{STR}$ differs from each of said frequency $F_1$, said frequency $F_0$, and said frequency $F_B$ said computer readable program code further comprising a series of computer readable program steps to effect transmitting said fourth waveform prior to transmitting said data waveforms.

13. The initiating enclosure of claim 12, further comprising a fifth waveform comprising a frequency $F_{CA}$ encoded in said non-transitory computer readable medium, wherein said frequency $F_{CA}$ differs from each of said frequency $F_1$, said frequency $F_0$, said frequency $F_B$, and said frequency $F_{STR}$ wherein said frequency $F_{CA}$ differs from each of said frequency $F_1$, said frequency $F_0$, said frequency $F_B$, said frequency $F_{STP}$ and said frequency $F_{STR}$, said computer readable program code further comprising a series of computer readable program steps to effect:
determining if said fifth waveform was received after transmitting said fourth waveform; and
operative if said fifth waveform was received by said initiating enclosure after transmitting said fourth waveform, transmitting data waveforms.

14. The initiating enclosure of claim 13, further comprising a sixth waveform comprising a frequency $F_{DA}$ encoded in said non-transitory computer readable medium, wherein said frequency $F_{DA}$ differs from each of said frequency $F_1$, said frequency $F_0$, said frequency $F_B$, said frequency $F_{STR}$, and said frequency $F_{CA}$, said computer readable program code further comprising a series of computer readable program steps to effect:
determining if said sixth waveform was received after transmitting said data waveforms; and operative if said sixth waveform was not received after transmitting said data waveforms, discontinuing transmissions.

15. The initiating enclosure of claim 14, further comprising a seventh waveform comprising a frequency $F_{STP}$ encoded in said non-transitory computer readable medium, wherein said frequency $F_{STP}$ differs from each of said frequency $F_1$, said frequency $F_0$, said frequency $F_B$, said frequency $F_{STR}$, said frequency $F_{DA}$ and said frequency $F_{CA}$, said computer readable program code further comprising a series of computer readable program steps to effect transmitting said seventh waveform if said sixth waveform was received after transmitting said data waveforms.

16. A responding enclosure disposed in a data storage library and in communication with an initiating enclosure disposed in said data storage library, said first enclosure comprising a processor and a non-transitory computer readable medium comprising an encoded first waveform comprising a frequency $F_B$, an encoded second waveform comprising a frequency $F_0$, an encoded third waveform comprising a frequency $F_1$, and computer readable program code disposed therein to communicate information within said data storage library, wherein said frequency $F_1$ differs from both said frequency $F_0$ and said frequency $F_B$, the computer readable program code comprising a series of computer readable program steps to effect receiving a byte of data encoded as eight data waveforms, wherein each data waveform comprises said frequency $F_B$ in combination with either said frequency $F_1$ or said frequency $F_0$.

17. The method of claim 16, further comprising a fourth waveform comprising a frequency $F_{STR}$ encoded in said non-transitory computer readable medium, wherein said frequency $F_{STR}$ differs from each of said frequency $F_1$, said frequency $F_0$, and said frequency $F_B$, said computer readable program code further comprising a series of computer readable program steps to effect receiving said fourth waveform prior to receiving said data waveforms.

18. The method of claim 17, further comprising a fifth waveform comprising a frequency $F_{CA}$ encoded in said non-transitory computer readable medium, wherein said frequency $F_{CA}$ differs from each of said frequency $F_1$, said frequency $F_0$, said frequency $F_B$, said frequency $F_{STP}$ and said frequency $F_{STR}$, said computer readable program code further comprising a series of computer readable program steps to effect transmitting said fifth waveform after receiving said fourth waveform and before receiving said data waveforms.

19. The method of claim 18, further comprising a sixth waveform comprising a frequency $F_{DA}$ encoded in said non-transitory computer readable medium, wherein said frequency $F_{DA}$ differs from each of said frequency $F_1$, said frequency $F_0$, said frequency $F_B$, said frequency $F_{STR}$, said frequency $F_{CA}$, and said frequency $F_{STP}$, said computer readable program code further comprising a series of computer readable program steps to effect transmitting said sixth waveform after receiving said eight data waveforms.

20. The method of claim 19, further comprising a seventh waveform comprising a frequency $F_{STP}$ encoded in said non-transitory computer readable medium, wherein said frequency $F_{STP}$ differs from each of said frequency $F_1$, said frequency $F_0$, said frequency $F_B$, said frequency $F_{STR}$, said frequency $F_{DA}$ and said frequency $F_{CA}$, said computer readable program code further comprising a series of computer readable program steps to effect receiving said seventh waveform after transmitting said sixth waveform.

* * * * *